(12) United States Patent
Brannen, Jr. et al.

(10) Patent No.: US 8,359,590 B2
(45) Date of Patent: Jan. 22, 2013

(54) COMPUTER SYSTEM AND A METHOD OF DEPLOYING AN APPLICATION IN A COMPUTER SYSTEM

(75) Inventors: Samuel Hugh Brannen, Jr., Meilen (CH); Adrian Mark Colyer, Southampton (GB); Rob Harrop, Southampton (GB); Glyn Normington, Southampton (GB); Andy Wilkinson, Southampton (GB)

(73) Assignee: VMware, Inc., Palo Alto, CA (US)

( * ) Notice: Subject to any disclaimer, the term of this patent is extended or adjusted under 35 U.S.C. 154(b) by 912 days.

(21) Appl. No.: 12/400,866

(22) Filed: Mar. 10, 2009

(65) Prior Publication Data

US 2009/0276767 A1 Nov. 5, 2009

(30) Foreign Application Priority Data

Apr. 30, 2008 (GB) .................................. 0807865.1

(51) Int. Cl.
*G06F 9/44* (2006.01)
(52) U.S. Cl. .......................... 717/166; 717/116; 717/148
(58) Field of Classification Search .................... 717/166
See application file for complete search history.

(56) References Cited

U.S. PATENT DOCUMENTS

| | | | |
|---|---|---|---|
| 6,769,126 B1 * | 7/2004 | Pekowski | 717/166 |
| 7,320,005 B2 * | 1/2008 | Li et al. | 1/1 |
| 7,870,546 B2 * | 1/2011 | Meduri et al. | 717/166 |
| 7,984,419 B2 * | 7/2011 | Fey | 717/148 |
| 2002/0093856 A1 * | 7/2002 | Baentsch et al. | 365/200 |
| 2006/0242625 A1 * | 10/2006 | Fey | 717/116 |
| 2007/0083925 A1 | 4/2007 | Hargrave et al. | |
| 2007/0198475 A1 * | 8/2007 | Meduri et al. | 707/3 |
| 2008/0127141 A1 * | 5/2008 | Fulton | 717/148 |
| 2008/0127157 A1 * | 5/2008 | Burns et al. | 717/166 |
| 2009/0083708 A1 * | 3/2009 | Knibb et al. | 717/116 |

OTHER PUBLICATIONS

Todd Millstein, Relaxed MultiJava: Balancing Extensibility and Modular Typechecking, 2003, ACM, 17 pages, <URL:http://delivery.acm.org/10.1145/950000/949325/p224-millstein.pdf>.*

Alexandre Bergel, Classbox/J: Controlling the Scope of Change in Java, 2005, ACM, 13 pages, <URL:http://delivery.acm.org/10.1145/1100000/1094826/p177-bergel.pdf>.*

James Sasitorn, Component NextGen: A Sound and Expressive Component Framework for Java, 2007, ACM, 18 pages, <URL:http://delivery.acm.org/10.1145/1300000/1297039/p153-sasitorn.pdf>.*

(Continued)

*Primary Examiner* — Thuy Dao
*Assistant Examiner* — Hua Lu (57) ABSTRACT

A computer system has a runtime environment (e.g. Java) and a deployment unit (e.g. in a Spring framework layer) arranged to deploy the application into the runtime environment. The application comprises bundles (e.g. OSGi bundles) with manifest metadata having export statements defining exported packages. The deployment unit comprises a receiver unit to receive the bundles, an extractor unit to examine the metadata and extract the export statements, a converter unit to convert each of the export statements into a corresponding import statement, and a creator unit to add a synthetic bundle having the import statements inserted in its metadata. The deployment unit sets a thread context class loader to delegate class loading to a class loader of the synthetic bundle. Thus, at runtime, classes of the application are only loaded when they are explicitly exported packages as defined by the synthetic bundle.

13 Claims, 5 Drawing Sheets

OTHER PUBLICATIONS

Sean McDirmid, Jiazzi: New-Age Components for Old-Fashioned Java, 2001, ACM, 12 pages, <URL:http://delivery.acm.org/10.1145/510000/504298/p211-mcdirmid.pdf>.*

Do-Woo Kim, A Study on the Optimization of Class File for Java Card Platform, 2002, Google Scholar, 8 pages, <URL:http://www.springerlink.com/content/nw37e870gkq610cx/fulltext.pdf>.*

Mikolaj Baranowski, Vercors Comonent Environment, 2008, Google Scholar, 18 pages, <URL:http://wwwsop.inria.fr/oasis/Vercors/doc/VCE-oct2008.pdf>.*

European Search Report as mailed in Application No. 09158384.9-1243 on Aug. 27, 2009.

Watson, Thomas, "Automatic Generation of Import Package Statements" [Online] Jun. 5, 2006, pp. 1-4, XP002540650. Retrieved from the Internet: URL: http://mail-archives.apache.org/mod_mbox/felix-dev/200606.mbox/%3COF2DB6706C.1CA6EB46-ON86257184.0046F31A-86257184.0049BOF3@us.ibm.com%3E> [retrieved on Aug. 7, 2009].

* cited by examiner

COMPUTER SYSTEM AND A METHOD OF DEPLOYING AN APPLICATION IN A COMPUTER SYSTEM

RELATED APPLICATIONS

This application claims priority to United Kingdom patent application number GB0807865.1 filed on Apr. 30, 2008, the contents of which are incorporated herein by reference in their entirety.

BACKGROUND

1. Technical Field

The present invention relates in general to the field of computers and computer systems. More particularly, the present invention relates to a computer system adapted to deploy an application program. Also, the present invention relates to a method of deploying an application program in a computer system.

2. Description of the Related Art

In general, an application program is developed on a development computer system, and is then deployed on a host computer system where it will be run (executed). The deployment process turns the application into its final executable form. Typically, this deployment includes the creation of links between the application and any libraries upon which the application relies. However, unintended dependencies may arise between the application program and the libraries, and these dependencies may cause difficulties and unexpected behaviour in the host computer system.

Figure 1:
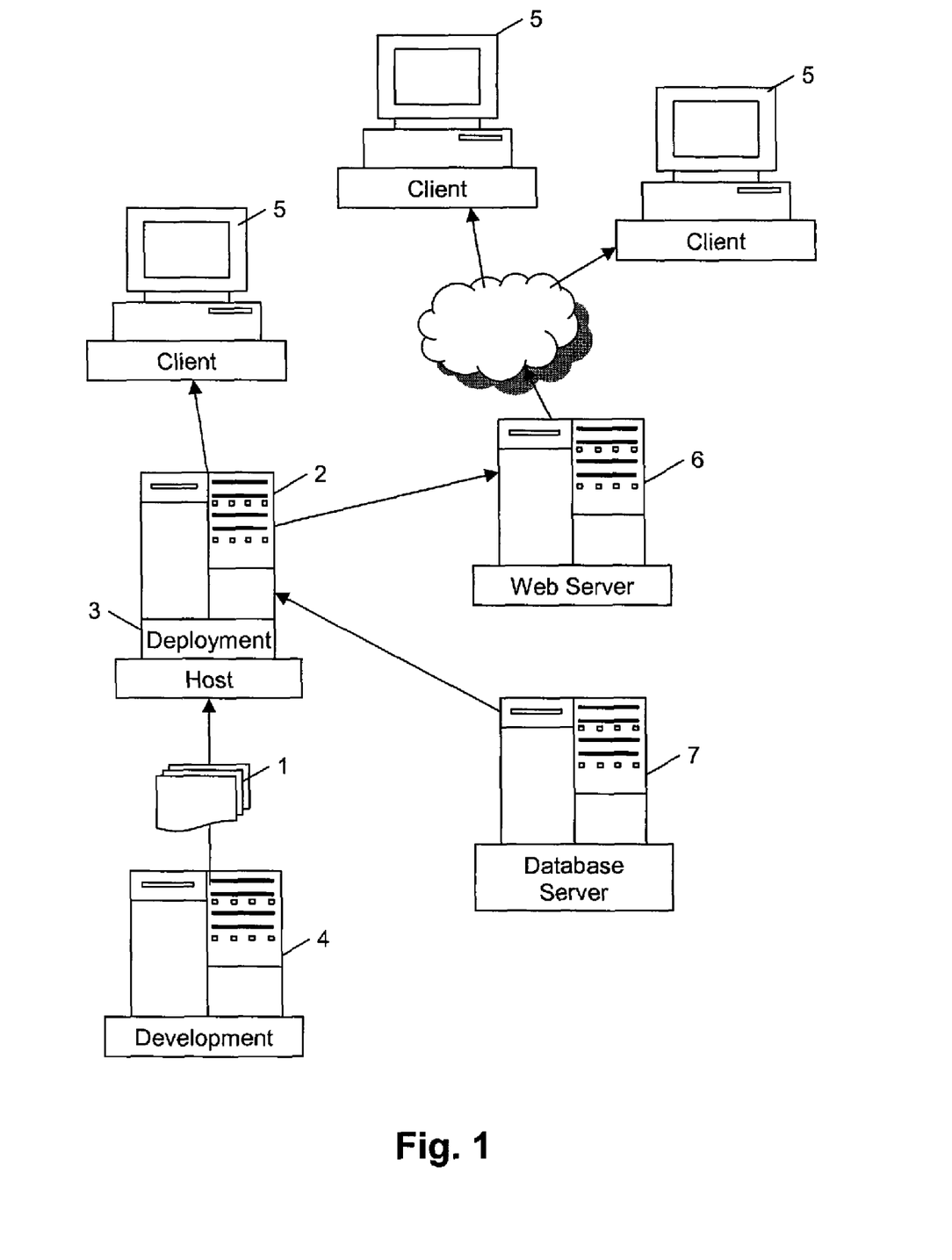
FIG. 1 is a schematic overview of an example computer network of the related art.

FIG. 1 is a schematic overview of an example computer network of the related art. Here, an application 1 is developed on a development system 4 and is then deployed on one or more host computer systems 2, using a deployment mechanism 3. The application 1 then runs on the host computer system 2 and, in this example, serves one or more individual end-user clients 5, either over a local network or via intermediaries such as a web server 6. The application 1 often will also communicate with various other back-end computers such as a set of database servers 7. FIG. 1 is only an illustrative example and many other specific network configurations will be apparent to those skilled in the art.

Application programs are often developed using object-oriented programming languages, such as the popular Java language developed by SUN MICROSYSTEMS. More recently, Java 2 Standard Edition (J2SE) and Java 2 Enterprise Edition (JEE or J2EE) have been developed to support a very broad range of applications from the smallest portable applets through to large-scale multilayer server applications such as complex controls for processes, manufacturing, production, logistics, and other commercial applications. Java relies upon a virtual machine which converts universal Java bytecode into binary instructions in the instruction set of the host computer system. Increasingly, applications are developed with the assistance of middleware such as the Spring framework (see www.springframework.org) and are released as a collection of OSGi bundles (see www.osgi.org). The Java virtual machine includes a comprehensive set of standard class libraries which are then used by many different application programs. These libraries provide a well-known set of functions to perform common tasks, such as maintaining lists of items or performing complex string parsing. Also, the class libraries provide interfaces to tasks that would normally depend heavily on the hardware and operating system of the host machine, such as access to files and networking. Thus, libraries are vital to most modern application programs. It is desired that the host computer system should implement libraries and applications in a manner which is both stable and reliable. In particular, it is desired to avoid unintended dependencies between the libraries and the application programs.

SUMMARY OF THE INVENTION

According to the present invention there is provided a computer system, a method and a computer-readable storage medium, as set forth in the appended claims. Other, optional, features of the invention will be apparent from the dependent claims and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

The example embodiments of the present invention discussed herein concern the reliability and stability of a computing system. In particular, the exemplary embodiments of the present invention concern an improved deployment mechanism for deploying an application into a runtime environment of a host computer system.

In one example embodiment, a computer system has a runtime environment (e.g. Java) and a deployment unit (e.g. in a Spring framework layer) arranged to deploy the application into the runtime environment. The application comprises bundles (e.g. OSGi bundles or JSR 277 modules) with manifest metadata having export statements defining exported packages. The deployment unit comprises a receiver unit to receive the bundles, an extractor unit to examine the metadata and extract the export statements, a converter unit to convert each of the export statements into a corresponding import statement, and a creator unit to add a synthetic bundle having the import statements inserted in its metadata. The deployment unit sets a thread context class loader to delegate class loading to a class loader of the synthetic bundle. Thus, at runtime, classes of the application are only loaded when they are explicitly exported packages as defined by the synthetic bundle. As a result, reliability and stability of the computer system are improved.

In one exemplary aspect of the present invention there is provided a computer system comprising a processor, a memory, a runtime environment and a deployment unit. The runtime environment is arranged to support execution of an application with respect to the memory and the processor, whilst the deployment unit is arranged to deploy the application into the runtime environment. Suitably, the application is divided into a plurality of bundles each comprising one or more classes and metadata relating to the bundle. The metadata includes export statements defining at least some of the classes as an exported package. The deployment unit comprises a receiver unit arranged to receive the application, an extractor unit arranged to examine the metadata and extract each of the export statements from the metadata, a converter unit arranged to convert each of the export statements into a corresponding import statement defining the respective exported package as an imported package, and a creator unit arranged to create a synthetic bundle comprising metadata and a class loader, insert the import statements into the metadata of the synthetic bundle, and add the synthetic bundle to the application. The runtime environment includes a thread context class loader associated with a thread of the application to load the exported packages into the runtime environment for execution by the processor, at least one library to support the program, and at least one class loader associated with the library, wherein the class loader associated with the library delegates to the thread context class loader. The deployment unit is further arranged to set the thread context class loader to delegate class loading to the class loader of the synthetic bundle and the class loader of the synthetic bundle is arranged to load each of the exported packages of the plurality of bundles as the imported packages from the synthetic bundle.

In an example embodiment, the thread context class loader is arranged to delegate class loading relating to the classes of the application to the class loader of the synthetic bundle, and the class loader of the synthetic bundle is arranged to fail class loading where a class load refers to a class which is not found in one of the imported packages imported in the import statements in the metadata of the synthetic bundle.

In an example embodiment, the runtime environment further comprises a bundle management layer (e.g. an OSGi layer) arranged to dynamically manage the plurality of bundles. Here, the bundle management layer is arranged to form a delegation graph with respect to the class loaders of the bundles in the application, wherein the delegation graph delegates to the class loader of the synthetic bundle.

In an example embodiment, the runtime environment further comprises a framework layer (e.g. a Spring framework layer) arranged to interface between the application and the runtime environment.

In an example embodiment, the deployment unit is arranged to add the synthetic bundle to the application in a deployment phase prior to execution of the application, and the runtime environment is arranged to load classes relating to the exported packages of the application through the class loader of the synthetic bundle at runtime during execution of the application.

In an example embodiment, the creator unit is further arranged to scope the synthetic bundle according to a name and a version of the application. Also, optionally, the converter unit is further arranged to convert one or more parameters of the export statements into corresponding parameters in the import statements.

In an example embodiment, the export statements each comprise a package name and the exporter unit further comprises a reporter unit which is arranged to generate an error report when any two or more of the export statements share the same package name.

In an example embodiment, the classes comprise instructions in a dynamically compiled programming language and the runtime environment includes a virtual machine arranged to execute the instructions of the dynamically compiled programming language on the processor.

In another exemplary aspect of the present invention there is provided a method of deploying an application program into a runtime environment of a computer system, the method comprising the computer-implemented steps of: receiving the application program divided into a plurality of bundles each comprising one or more classes and metadata including export statements defining at least one of the classes as an exported package, extracting each of the export statements from the metadata, converting each of the export statements into a corresponding import statement defining the respective exported package as an imported package, creating a synthetic bundle comprising metadata and a class loader, inserting the import statements into the metadata of the synthetic bundle, adding the synthetic bundle to the application program, and setting a thread context class loader of the runtime environment associated with a thread of the application program to delegate class loading to the class loader of the synthetic bundle.

In a further exemplary aspect of the present invention there is provided a computer-readable storage medium having recorded thereon instructions to form a deployment unit which when implemented by a computer system deploys an application program into a runtime environment of the computer system, the medium comprising: code configured to receive the application program divided into a plurality of bundles each comprising one or more classes and metadata including export statements defining at least one of the classes as an exported package, code configured to extract each of the export statements from the metadata, code configured to convert each of the export statements into a corresponding import statement defining the respective exported package as an imported package, code configured to create a synthetic bundle comprising metadata and a class loader, insert the import statements into the metadata of the synthetic bundle, and add the synthetic bundle to the application program, and code configured to set a thread context class loader of the runtime environment associated with a thread of the application program to delegate class loading to the class loader of the synthetic bundle.

In a further exemplary aspect of the present invention there is provided a computer-implemented method of forming an application program executable in a runtime environment of a computer system, the method comprising: providing a plurality of bundles comprising metadata including export statements defining exported packages; providing an additional bundle comprising metadata and a class loader, wherein the metadata of the additional bundle comprises import statements corresponding to each of the export statements in the metadata of the plurality of bundles; and providing code to set a thread context class loader of the runtime environment associated with a thread of the application program to delegate class loading to the class loader of the additional bundle.

In a further exemplary aspect of the present invention there is provided a computer-readable storage medium having recorded thereon instructions to form an application program executable in a runtime environment of a computer system, the medium comprising: code configured to provide a plurality of bundles each comprising one or more classes and metadata including export statements defining at least one of the classes as an exported package, code configured to provide an additional bundle comprising metadata and a class loader, wherein the metadata of the additional bundle comprises import statements corresponding to each of the export statements, and code configured to set a thread context class loader of the runtime environment associated with a thread of the application program to delegate class loading to the class loader of the additional bundle.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be embodied in software, or as a combination of software and hardware. Here, the software is configured to reside on an addressable storage medium and is configured to execute on one or more processors. The medium may take any suitable structure including an optical medium such as CD or DVD, a magnetic medium such as tape, floppy disk, or hard disk, or a solid-state medium such as dynamic or static random access memories (DRAMs or SRAMs), erasable and programmable read-only memories (EPROMs), electrically erasable and programmable read-only memories (EEPROMs) and flash memories. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed herein, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE EXEMPLARY EMBODIMENTS

The exemplary embodiments of the present invention will be discussed in detail in relation to Java and Spring. However, the teachings, principles and techniques of the present invention are also applicable in other exemplary embodiments. For example, embodiments of the present invention are also applicable to other virtual machine environments and other middleware platforms, which will benefit from the teachings herein.

Figure 2:
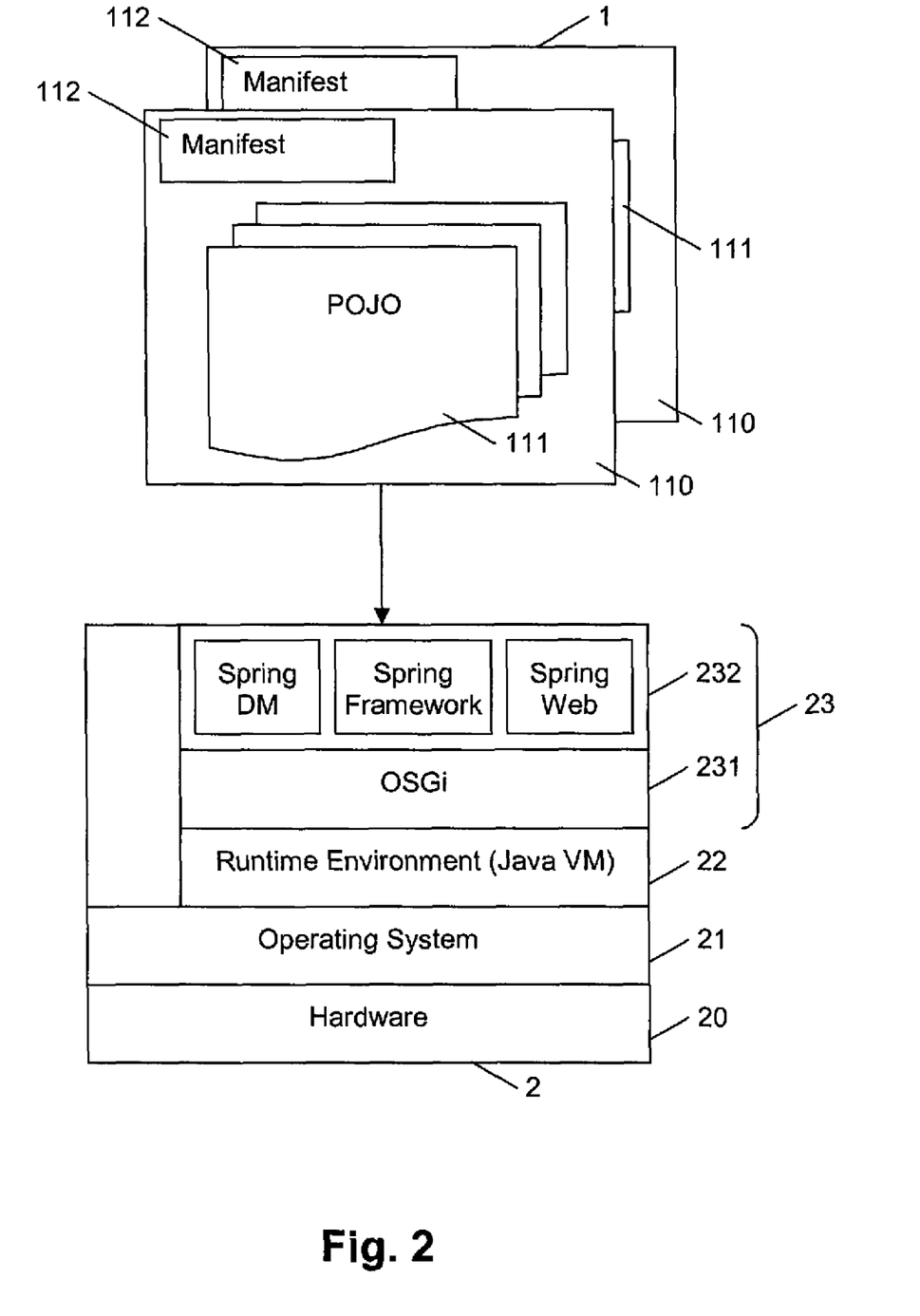
FIG. 2 is a schematic overview of a host computer system according to an exemplary embodiment of the present invention.

FIG. 2 is a schematic overview of a host computer system according to an exemplary embodiment of the present invention. In this example, the host computer system 2 includes hardware 20 such as processors, memory, I/O, network cards, etc., an operating system 21 such as WINDOWS, LINUX or SOLARIS, and a runtime environment 22 such as Java or MICROSOFT.NET. Further, the host computer 2 includes a middleware layer 23. This layer serves as an intermediary between the application program 1 and the underlying layers with their various different network technologies, machine architectures, operating systems and programming languages. In the illustrated example, the middleware layer 23 includes a bundle management layer 231 such as an OSGi layer that manages OSGi bundles (here, for further background information, see www.osgi.org). The middleware 23 also includes a framework layer 232, such as a Spring framework layer (see www.springframework.org) with associated components, such as a Spring Dynamic Module (Spring DM) which interfaces with the bundle management layer 231. In this example, the framework layer 232 further includes a Spring Web package which interfaces with a front-end application server environment or container such as Apache Tomcat, IBM WebSphere or BEA WebLogic, amongst others.

These and other specific components of the framework layer will be apparent to those skilled in the art and need not be discussed here in detail.

The application 1 is conveniently formatted as a plurality of bundles 110. In general terms, a bundle is a packet, module or other subdivision comprising one or more portions of computer code (classes) which form part of an application program. Typically, the code in one bundle 110 will rely upon code in one or more other bundles 110 for proper execution of the application program 1. Thus, the bundles 110 are semi-independent collections of computer code but which are interdependent upon one another as part of a larger application. In this example, each of the bundles 110 comprises zero or more classes 111 which are grouped into one or more logically related packages, and a manifest 112 containing metadata (e.g. a standard JAR manifest or some other form of XML-based file) concerning the classes 111 in that bundle 110. Conveniently, the Spring framework layer 232 allows the application to be based, in large part, on Plain Old Java Objects (POJOs). Those skilled in the art will appreciate that other equivalent terminologies will be appropriate in other specific implementations. For example, in the Java Enterprise Edition (JEE) environment, the bundles are instead termed "modules". In one exemplary embodiment, the bundles 110 are each modules compliant with JSR 277 (see www.jcp.org).

Typically, the application program 1 is released by the developer system with each bundle 110 in the form of a compressed Zip or JAR (Java archive) file ready to be deployed on the host computer system 2. Other examples include WAR (web archive) files and EAR (enterprise archive) files. The bundle management layer 231 manages installation and update of the bundles 110 in an OSGi environment in a dynamic and scalable fashion. In particular, this bundle management layer 231 assists in managing the dependencies which are formed when classes are shared between bundles.

Figure 3:
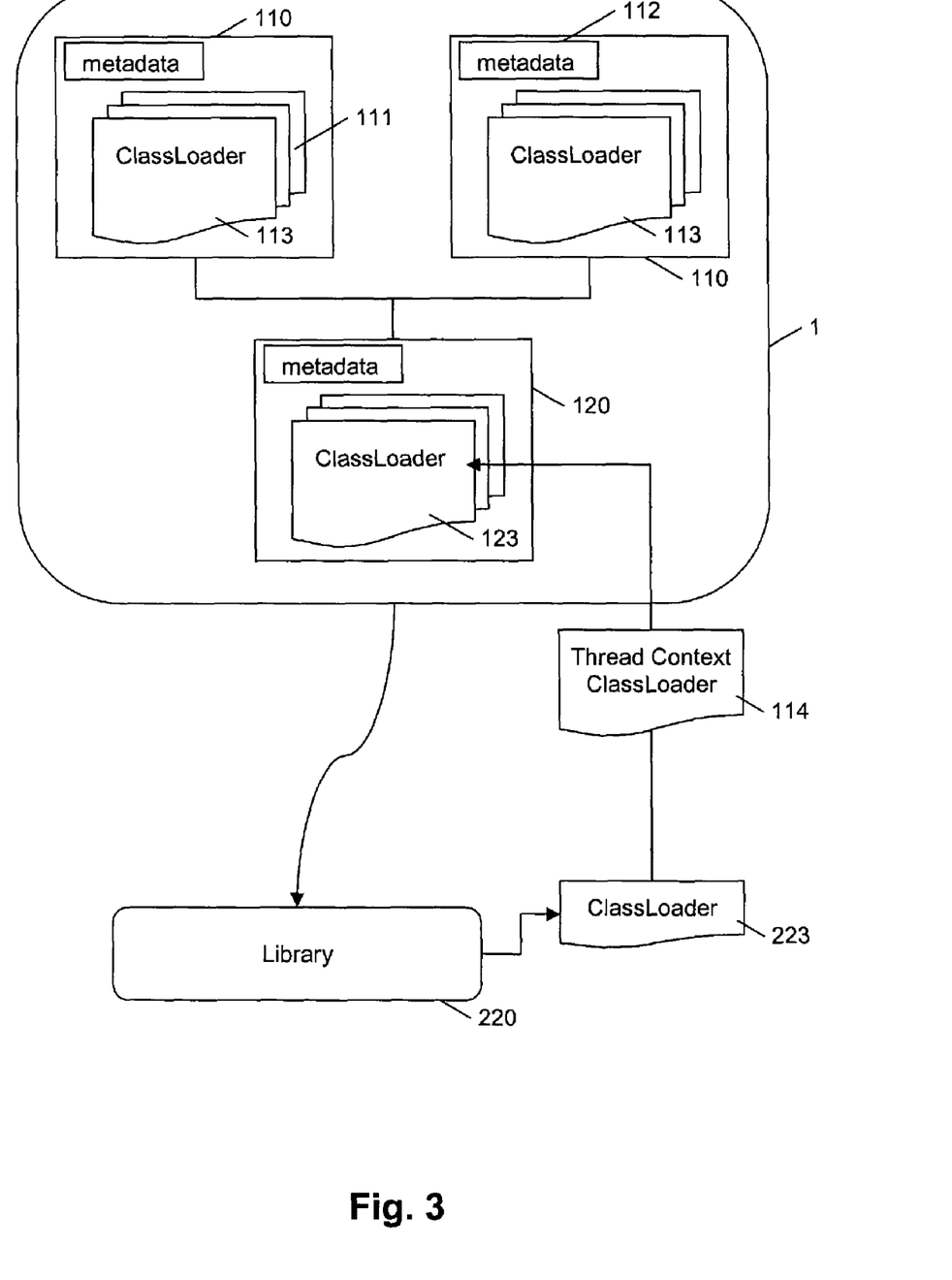
FIG. 3 is a schematic diagram showing selected parts of the exemplary host computer system related to execution of an application program.

FIG. 3 is a schematic diagram showing selected parts of the host computer system when running the application program 1. In particular, FIG. 3 shows the classes 111 of the application 1 arranged in a plurality of bundles 110, which are each associated with a respective class loader 113. A special one of these bundles, here termed a synthetic bundle 120, likewise has an associated class loader 123. Also, a thread context class loader (TCCL) 114 is associated with the application program 1. Further, one or more libraries 220 are provided, which are also each associated with one or more respective class loaders 223.

A class loader is an object that is responsible for loading classes. Unlike applications written in statically compiled programming languages such as C and C++, dynamically compiled programming languages such as Java only link classes to libraries when those classes are loaded into the Java virtual machine dynamically at runtime. Classes are loaded into the Java virtual machine as they are needed. Further, when a loaded class depends on another class, then that class is also loaded.

Given the name of a class, a class loader tries to locate or generate data that constitutes a definition for the class. Typically, the class loader transforms the given class name into a file name and then reads a ".class" file of that name from a file system of the host computer. Class loaders use a delegation model to search for classes and resources. That is, each instance of class loader has an associated parent. When requested to find a class or resource, a class loader instance will delegate the search for the class or resource to its parent class loader before attempting to find the class or resource itself. The Java virtual machine's built-in class loader, called the "bootstrap class loader", does not itself have a parent but may serve as the parent of a class loader instance. Thus, the class loaders form a tree having the bootstrap class loader as the root node of the tree, and delegate class loading upwards toward the root node through successive ancestors according to the delegation model. Looking again briefly at FIG. 2, in the illustrated example the bundle management layer 231 typically forms a delegation graph relating to the OSGi class loaders 113 of the OSGi bundles 110.

Each application has one or more threads of execution in the Java virtual machine, and each thread is associated with a respective context class loader. Conveniently, this class loader is termed the thread context class loader (TCCL) 114. Usually the TCCL is capable of loading any of the classes in the application 1. By default, the TCCL is the class loader that loaded the application into the Java virtual machine. However, the TCCL can also be changed during runtime.

As mentioned above, many of the classes 111 in the application 1 will reference the one or more libraries 220 provided in the runtime environment. A number of popular Java libraries need to load application classes even though the libraries are general purpose and do not have a dependency on any specific application. FIG. 3 shows one example library 220, such as the popular Hibernate that is primarily used to map from Java classes to database tables (and from Java data types to SQL data types). In particular, Hibernate generates SQL calls to pass data into and out of database applications. The class loader 223 associated with the library 220 loads classes to assist execution of the library.

Typically, a class loader calls a desired class using a method of the form "class.forName". The name of the class is given as a string argument. Thus, calling class.forName ("foox") will return the class object for the class named "foox". The method then attempts to locate, load, link, and optionally initialize, the named class.

The delegation model means that the class loader 223 associated with the library 220 will first attempt to delegate class loading to a parent class loader prior to attempting class loading itself. However, this can lead to unexpected errors.

The synthetic bundle 120 is a special additional bundle which is created during deployment of the application program onto the host computer system, as will be explained in more detail below. In the runtime environment illustrated in FIG. 3, the class loader 223 of the library 220 delegates to the thread context class loader 114, either as its direct parent or indirectly through other intermediate generations of class loaders, according to the delegation model. Then, the thread context class loader 114 delegates to the class loader 123 of the synthetic bundle 120. The TCCL 114 does not delegate to any other bundle 110, i.e. any of the regular bundles 110, within the application program 1.

Figure 4:
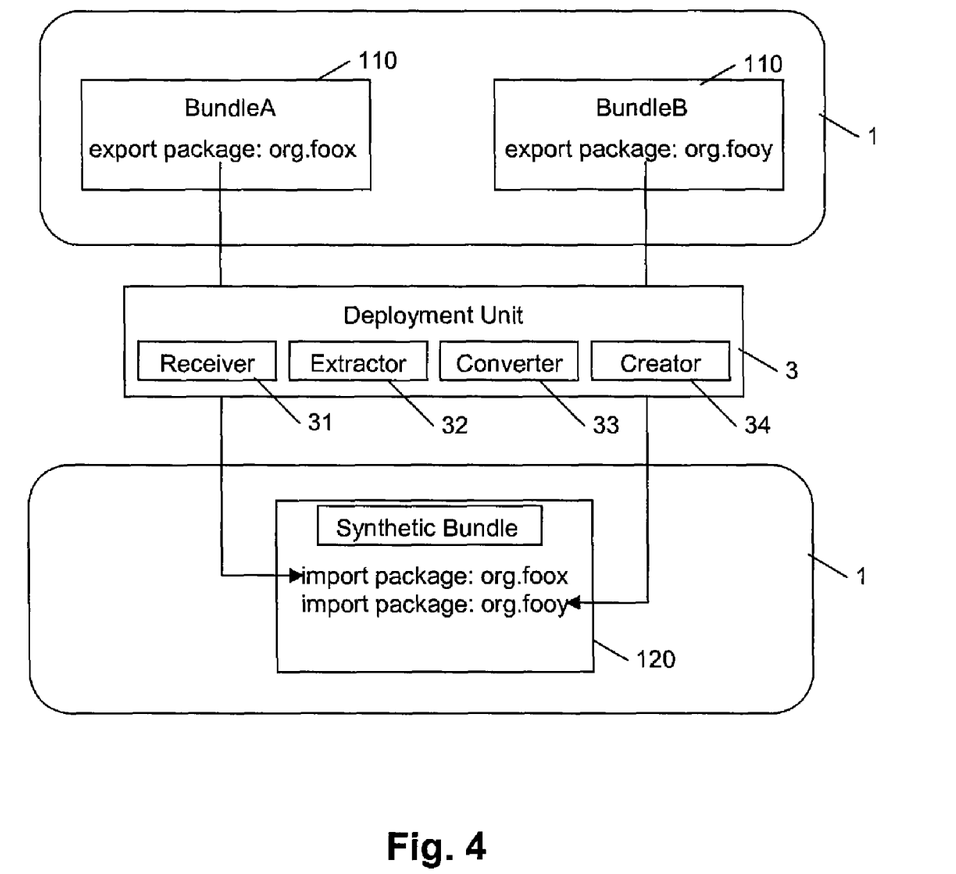
FIG. 4 is a schematic diagram showing selected parts of the exemplary host computer system related to deployment of an application program.

FIG. 4 is a schematic diagram showing selected parts of the host computer system related to deployment of the application program 1. The deployment unit 3 suitably comprises a receiver unit 31, an extractor unit 32, a converter unit 33 and a creator unit 34.

The receiver unit 31 receives the application program 1, which may well have been released by a separate and unrelated development system (see FIG. 1). As discussed above, the application 1 comprises a plurality of bundles 110, of which two are illustrated in FIG. 4—namely BundleA and BundleB. That is, in the exemplary embodiments, the application is received as a collection of JAR files containing OSGi-compliant bundles each comprising one or more classes and manifest metadata.

The extractor unit 32 examines the metadata and extracts any and all export statements found therein. In this simplified illustrative example, BundleA exports the class package "org-.foox", whilst BundleB exports the class package "org.fooy".

The converter unit 33 converts each of the identified exports into corresponding imports.

The creator unit 34 inserts these imports into a newly-created special synthetic bundle 120, and adds the synthetic bundle 120 to the application program 1.

Finally, the deployment unit 3 completes the deployment of the augmented application 1 ready for runtime execution, including setting the TCCL 114 to delegate to the class loader 123 of the synthetic bundle 120 (see FIG. 3).

Here, in the example embodiments, the synthetic bundle 120 is an additional OSGi bundle. Suitably, the synthetic bundle 120 is scoped to have a name and a version based on the name and the version of the application, thus tying the synthetic bundle to the application. The converter unit 33 optionally performs parameter conversion to convert one or more parameters of an extracted export into reformatted parameters of the corresponding import. For example, parameters in the export relating to version number (e.g. version=2.1) are converted into a version range (e.g. 2.1<=version<2.2) in the import. Similarly, a mandatory vendor name attribute (e.g. vendor=springsource/mandatory:=vendor) in the export is converted into a corresponding mandatory attribute in the import (e.g. vendor=springsource).

As a further illustrative example, consider an application named "RefreshTest-1". The application comprises one or more bundles 110 that export the class package "refresh.exporter.b1". Following the deployment mechanism discussed above, the synthetic bundle 120 (i.e. the additional bundle synthetic.context) is created having XML-based manifest metadata as reproduced below:

Manifest-Version: 1.0
Platform-Scope: RefreshTest-1
Import-Package: refresh.exporter.b1
Bundle-ManifestVersion: 2
Bundle-SymbolicName: RefreshTest-synthetic.context
Bundle-Version: 1

In the example embodiments, the extractor unit 32 also functions as a reporter unit configured to generate reports concerning errors encountered during this deployment process. Optionally, the error reports are delivered to a user interface of the host computer system 2. Also, in the exemplary embodiments, the error reports are optionally transmitted from the host computer system 2 to the developer system 1 as feedback concerning this live deployment of the application 1.

In one example embodiment, the extractor unit 32 is configured to report an error upon detecting two or more exports that refer to the same package name, thus detecting unintended split packages within the exported class space of the application. For example, consider the situation where BundleA exports "org,foox.x" and BundleB exports "org-.foox.y", such that the class package is split between these two bundles. Here, the creator unit 34 prevents an attempt to export a split package in the synthetic bundle 120.

In another example embodiment, the extractor unit 32 is arranged to detect duplicate classes having the same name and thus protects the class name space in the exported packages of the application.

Application programs typically are assumed to exhibit modularity and thus only create dependencies which are explicitly intended by the application. However, as noted above referring to FIG. 3, the situation may arise wherein the dependency model delegates class loading from the class loader 223 of the library 220 back towards the application 1 through the TCCL 114, thus creating the potential for unintended dependencies where the application happens to contain a class having the sought-after class name. However, the synthetic bundle 120 now protects modularity of the application program, because the class load will fail unless the class has been explicitly exported by one of the regular application bundles 110 and hence imported into the synthetic bundle 120 to be exported from the application 1. The TCCL 114 delegates only to the class loader 123 of the synthetic bundle 120, and not to any other class loader 113 in the application 1, thus avoiding the creation of unexpected dependencies into the application program.

Figure 5:
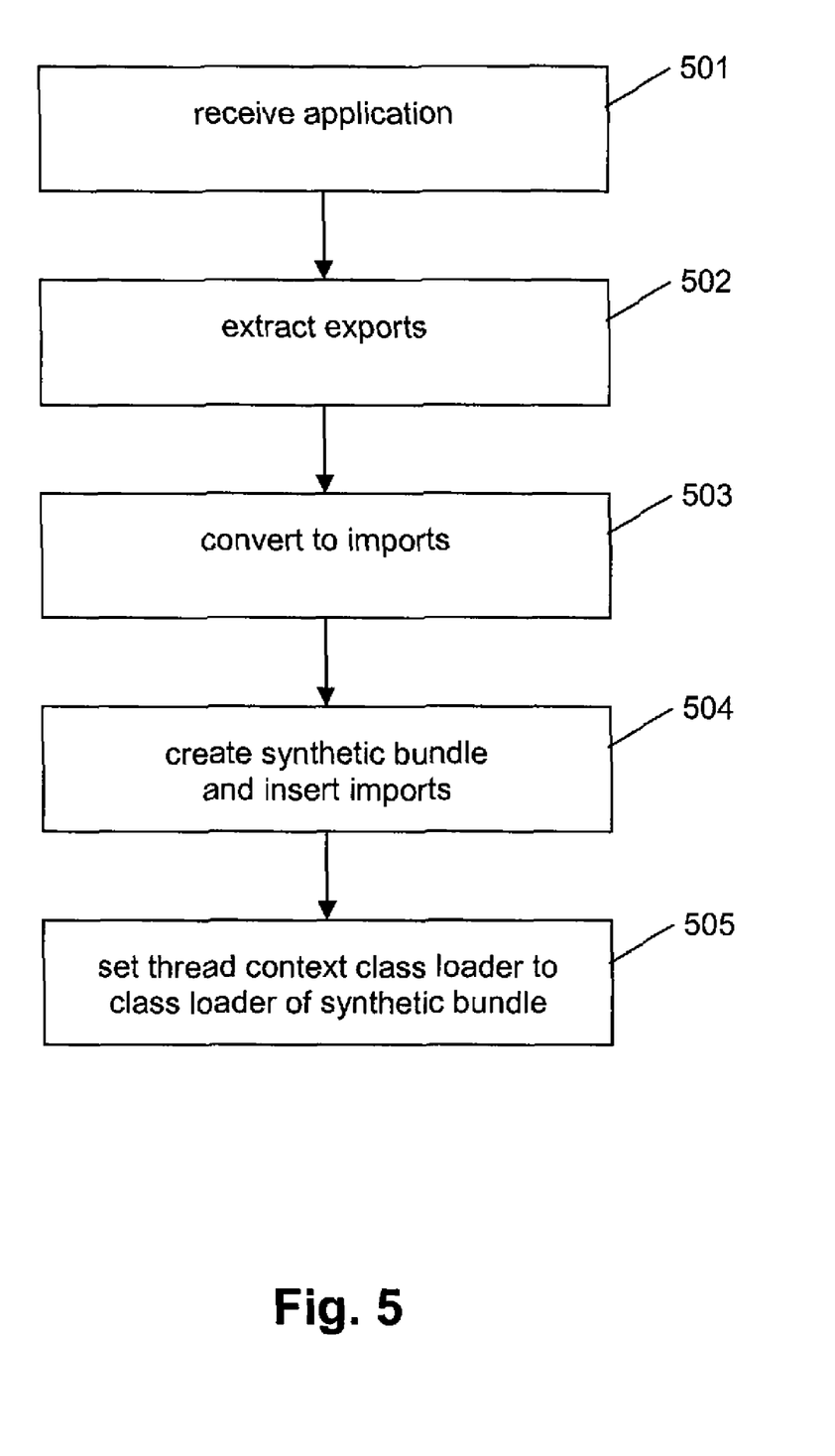
FIG. 5 is a flow diagram illustrating an example method of deploying an application program into a runtime environment of the host computer system.

FIG. 5 is a flow diagram illustrating an example method of deploying an application program into a runtime environment of the host computer system. At step 501, the raw, unamended application program 1 is received, such as from the development system 4 of FIG. 1. At step 502, the metadata is examined and each of the export statements extracted from the metadata. At step 503, each of the export statements is converted into a corresponding import statement defining a respective exported class package as an imported class package, optionally including parameter transformation wherein parameters of the export statement are transformed into corresponding parameters of the import statement. At step 504, the additional synthetic bundle 120 is created comprising the manifest metadata and at least one class loader 123. Also, the import statements are inserted into the metadata of the synthetic bundle and the synthetic bundle 120 is added to the application program. At step 505, the thread context class loader of the runtime environment that is associated with a thread of the application program is set to delegate class loading to the class loader 123 of the synthetic bundle 120.

The deployment process discussed herein has many advantages. In particular, stability of the host computer system is improved and the host computer system is more reliable. These and other advantages of the exemplary embodiments will be appreciated by those skilled in the art from the discussion above, and from implementing the embodiments of the invention in practice.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of deploying an application program into a runtime environment of a computer system, the method comprising the computer-implemented steps of:

receiving the application program divided into a plurality of bundles each comprising one or more classes and metadata including export statements defining at least one of the classes as an exported package, wherein the runtime environment is arranged to support execution of the application program with respect to a memory and a processor, wherein the runtime environment includes a thread context class loader associated with a thread of the application program to load the exported package(s) into the runtime environment for execution by the processor, at least one library referenced by the application program, and at least one class loader associated with the library, wherein the class loader associated with the library delegates to the thread context class loader;

extracting each of the export statements from the metadata of the application program;

converting each of the export statements from the metadata of the application program into a corresponding import statement defining the respective exported package as an imported package;

creating a synthetic bundle comprising metadata and a class loader;

inserting the import statements into the metadata of the synthetic bundle;

adding the synthetic bundle to the application program;

setting the thread context class loader of the runtime environment associated with a thread of the application program to delegate class loading to the class loader of the synthetic bundle; and arranging the class loader of the synthetic bundle to load each of the exported package(s) of the plurality of bundles from the application program as the imported package(s) from the synthetic bundle.

2. A computer-implemented method of forming an application program executable in a runtime environment of a computer system, the method comprising:

providing a plurality of bundles comprising metadata including export statements defining exported packages;

providing code configured to extract each of the export statements from the metadata of the plurality of bundles;

providing code configured to convert each of the export statements from the metadata of the plurality of bundles into a corresponding import statement defining a respective exported package as an imported package;

providing an additional bundle comprising metadata and a class loader, wherein the metadata of the additional bundle comprises import statements corresponding to each of the export statements in the metadata of the plurality of bundles;

providing code to set a thread context class loader of the runtime environment associated with a thread of the application program to delegate class loading to the class loader of the additional bundle, wherein the runtime environment is arranged to support execution of the application program with respect to a memory and a processor, the runtime environment including the thread context class loader associated with the thread of the application program to load the exported packages into the runtime environment for execution by the processor, at least one library referenced by the application program, and at least one class loader associated with the library, wherein the class loader associated with the library delegates to the thread context class loader; and providing code to arrange the class loader of the additional bundle to load each of the exported packages of the plurality of bundles as the imported packages from the additional bundle.

3. A computer system, comprising:
a processor;
a memory comprising at least one computer-readable storage medium coupled to the processor;
a runtime environment arranged to support execution of an application with respect to the memory and the processor, wherein the application is divided into a plurality of bundles each comprising one or more classes and metadata relating to the classes, the metadata of at least one of the bundles including one or more export statements defining at least some of the classes as an exported package, the runtime environment including a thread context class loader associated with a thread of the application to load the exported packages into the runtime environment for execution by the processor, at least one library referenced by the application, and at least one class loader associated with the library, wherein the class loader associated with the library delegates to the thread context class loader; and
a deployment unit arranged to deploy the application into the runtime environment, the deployment unit comprising:
a receiver unit arranged to receive the application,
an extractor unit arranged to examine the metadata from the application and extract each of the export statements from the metadata,
a converter unit arranged to convert each of the export statements from the metadata of the application into a corresponding import statement defining the respective exported package as an imported package, and
a creator unit arranged to create a synthetic bundle comprising metadata and a class loader, insert the import statements into the metadata of the synthetic bundle, and add the synthetic bundle to the application,
wherein the deployment unit is further arranged to set the thread context class loader to delegate class loading to the class loader of the synthetic bundle and the class loader of the synthetic bundle is arranged to load each of the exported packages of the plurality of bundles from the application as the imported packages from the synthetic bundle.

4. The computer system of claim 3, wherein the thread context class loader is arranged to delegate class loading relating to the classes of the application to the class loader of the synthetic bundle, and the class loader of the synthetic bundle is arranged to fail class loading where a class load refers to a class which is not found in one of the imported packages imported in the import statements in the metadata of the synthetic bundle.

5. The computer system of claim 3, wherein the runtime environment further comprises a bundle management layer arranged to dynamically manage the plurality of bundles.

6. The computer system of claim 5, wherein the bundle management layer is arranged to form a delegation graph with respect to the class loaders associated with the application, including the class loader of the synthetic bundle.

7. The computer system of claim 3, wherein the deployment unit is arranged to add the synthetic bundle to the application in a deployment phase prior to execution of the application, and the runtime environment is arranged to load classes relating to the exported packages of the application through the class loader of the synthetic bundle at runtime during execution of the application.

8. The computer system of claim 3, wherein the creator unit is further arranged to scope the synthetic bundle according to a name and a version of the application.

9. The computer system of claim 3, wherein the converter unit is further arranged to convert one or more parameters of the export statements into corresponding parameters in the import statements.

10. The computer system of claim 3, wherein the exporter unit is arranged to export the export statements each comprising a package name, and is arranged to generate an error report when any two or more of the export statements share the same package name.

11. The computer system of claim 3, wherein the classes comprise instructions in a dynamically compiled programming language and the runtime environment includes a virtual machine arranged to execute the instructions of the dynamically compiled programming language on the processor.

12. A non-transitory computer-readable storage medium having recorded thereon instructions to form a deployment unit which when implemented by a computer system deploys an application program into a runtime environment of the computer system, the medium comprising:
code configured to receive the application program divided into a plurality of bundles each comprising one or more classes and metadata including export statements defining at least one of the classes as an exported package, wherein the runtime environment is arranged to support execution of the application program with respect to a memory and a processor, the runtime environment including a thread context class loader associated with a thread of the application program to load the exported package(s) into the runtime environment for execution by the processor, at least one library referenced by the application program, and at least one class loader associated with the library, wherein the class loader associated with the library delegates to the thread context class loader;
code configured to extract each of the export statements from the metadata of the application program;
code configured to convert each of the export statements from the metadata of the application program into a corresponding import statement defining the respective exported package as an imported package;
code configured to create a synthetic bundle comprising metadata and a class loader, insert the import statements into the metadata of the synthetic bundle, and add the synthetic bundle to the application program; and
code configured to set the thread context class loader of the runtime environment associated with a thread of the application program to delegate class loading to the class loader of the synthetic bundle and arrange the class loader of the synthetic bundle to load each of the exported package(s) of the plurality of bundles from the application program as the imported package(s) from the synthetic bundle.

13. A non-transitory computer-readable storage medium having recorded thereon instructions to form an application program executable in a runtime environment of a computer system, the medium comprising:
code configured to provide a plurality of bundles comprising metadata including export statements defining exported packages;
code configured to extract each of the export statements from the metadata of the plurality of bundles;
code configured to convert each of the export statements from the metadata of the plurality of bundles into a corresponding import statement defining a respective exported package as an imported package;

code configured to provide a synthetic bundle comprising metadata and a class loader, wherein the metadata of the synthetic bundle comprises import statements corresponding to each of the export statements in the metadata of the plurality of bundles;

code configured to set a thread context class loader of the runtime environment associated with a thread of the application program to delegate class loading to the class loader of the synthetic bundle, wherein the runtime environment is arranged to support execution of the application program with respect to a memory and a processor, the runtime environment including the thread context class loader associated with the thread of the application program to load the exported packages into the runtime environment for execution by the processor, at least one library referenced by the application program, and at least one class loader associated with the library, wherein the class loader associated with the library delegates to the thread context class loader; and code configured to arrange the class loader of the synthetic bundle to load each of the exported packages of the plurality of bundles as the imported packages from the synthetic bundle.

* * * * *